(12) United States Patent
Vichare et al.

(10) Patent No.: US 9,195,561 B2
(45) Date of Patent: *Nov. 24, 2015

(54) SYSTEM AND METHOD FOR PROACTIVE MANAGEMENT OF AN INFORMATION HANDLING SYSTEM WITH IN-SITU MEASUREMENT OF END USER ACTIONS

(71) Applicant: Dell Products L.P., Round Rock, TX (US)

(72) Inventors: Nikhil Vichare, Austin, TX (US); Takis Petropoulos, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,502

(22) Filed: May 5, 2014

(65) Prior Publication Data

US 2014/0245078 A1   Aug. 28, 2014

Related U.S. Application Data

(63) Continuation of application No. 12/958,751, filed on Dec. 2, 2010, now Pat. No. 8,726,095.

(51) Int. Cl.
*G06F 11/34* (2006.01)
*G06F 11/07* (2006.01)

(52) U.S. Cl.
CPC .......... *G06F 11/3409* (2013.01); *G06F 11/076* (2013.01); *G06F 11/0751* (2013.01); *G06F 11/0766* (2013.01); *G06F 11/3438* (2013.01)

(58) Field of Classification Search
CPC ............ G06F 11/0766; G06F 11/3409; G06F 11/3438; H04L 69/40; H04L 12/5875; H04L 41/147; H04L 43/16; H04L 67/36
USPC ......................................... 714/47.2, 47.1, 44
See application file for complete search history.

(56) References Cited

U.S. PATENT DOCUMENTS

| | | | |
|---|---|---|---|
| 3,575,589 A | 4/1971 | Neema et al. | |
| 4,497,057 A * | 1/1985 | Kato et al. | 714/46 |
| 5,369,469 A | 11/1994 | Leo et al. | |
| 5,440,688 A * | 8/1995 | Nishida | 714/4.1 |
| 5,761,223 A * | 6/1998 | Ando et al. | 714/774 |
| 6,230,284 B1 | 5/2001 | Lillevold | |
| 6,321,348 B1 | 11/2001 | Kobata | |
| 6,408,407 B1 * | 6/2002 | Sadler | 714/57 |
| 6,651,190 B1 | 11/2003 | Worley et al. | |
| 6,665,085 B1 | 12/2003 | Edmunds et al. | |

(Continued)

*Primary Examiner* — Loan L.T. Truong

(74) *Attorney, Agent, or Firm* — Terrile, Cannatti, Chambers & Holland, LLP; Robert W. Holland

(57) ABSTRACT

Dissatisfaction variables track inputs made by an end user at an information handling system that are associated with end user dissatisfaction regarding the operation of the information handling system, such as corrective actions, so that an alert issues if a dissatisfaction variable changes by a predetermined amount over a predetermined time period. Dissatisfaction variables identify a pattern of a change in behavior by an end user rather than the operational status of system components. For example, an increase in end user forced shutdowns of the information handling system indicates end user dissatisfaction with the information handling system, such as repeated freezes of the operating system so that performing a timely diagnostics will improve end user satisfaction and proactively correct and impending system failure.

20 Claims, 3 Drawing Sheets

(56) References Cited

U.S. PATENT DOCUMENTS

| | | |
|---|---|---|
| 6,853,722 B2 | 2/2005 | Joseph et al. |
| 7,124,326 B1 | 10/2006 | Niikawa |
| 7,373,382 B2 | 5/2008 | Nakai et al. |
| 7,380,171 B2 * | 5/2008 | Prescott et al. ............ 714/38.11 |
| 7,555,672 B2 * | 6/2009 | Berman et al. .................... 714/2 |
| 7,688,951 B1 * | 3/2010 | Bajpay et al. ................ 379/9.03 |
| 7,768,917 B2 | 8/2010 | Nakayama et al. |
| 7,788,198 B2 * | 8/2010 | Liu et al. ......................... 706/45 |
| 7,882,394 B2 * | 2/2011 | Hosek et al. ..................... 714/26 |
| 7,953,613 B2 | 5/2011 | Gizewski |
| 8,041,710 B2 * | 10/2011 | He et al. ........................ 707/722 |
| 8,234,486 B2 | 7/2012 | Bernardini et al. |
| 8,266,072 B2 | 9/2012 | Grace et al. |
| 8,284,685 B2 * | 10/2012 | Bajpay et al. ................ 370/252 |
| 8,374,894 B2 | 2/2013 | Weinstock et al. |
| 8,381,038 B2 * | 2/2013 | Hasegawa et al. .............. 714/39 |
| 8,521,474 B2 | 8/2013 | Kayani |
| 2002/0053029 A1 | 5/2002 | Nakamura et al. |
| 2002/0169594 A1 | 11/2002 | Yasuda et al. |
| 2003/0028891 A1 | 2/2003 | Hardt et al. |
| 2004/0158367 A1 * | 8/2004 | Basu et al. ....................... 701/29 |
| 2005/0050377 A1 * | 3/2005 | Chan et al. ......................... 714/4 |
| 2005/0081118 A1 * | 4/2005 | Cheston et al. ................. 714/47 |
| 2006/0200691 A1 | 9/2006 | Yomo et al. |
| 2006/0200726 A1 | 9/2006 | Gittins et al. |
| 2006/0236198 A1 * | 10/2006 | Lintz et al. ..................... 714/758 |
| 2007/0061876 A1 * | 3/2007 | Adams et al. ................... 726/11 |
| 2007/0177523 A1 * | 8/2007 | Nagami et al. ................ 370/252 |
| 2007/0250614 A1 | 10/2007 | Szabo |
| 2008/0085502 A1 * | 4/2008 | Allen et al. .................... 434/365 |
| 2008/0091983 A1 * | 4/2008 | Boss et al. ....................... 714/48 |
| 2009/0144248 A1 | 6/2009 | Treadgold et al. |
| 2010/0064177 A1 * | 3/2010 | Li et al. ........................... 714/38 |
| 2010/0083029 A1 * | 4/2010 | Erickson et al. .................. 714/2 |
| 2010/0289845 A1 * | 11/2010 | Conway et al. ................. 347/16 |
| 2011/0138462 A1 * | 6/2011 | Kim et al. ....................... 726/22 |

* cited by examiner

SYSTEM AND METHOD FOR PROACTIVE MANAGEMENT OF AN INFORMATION HANDLING SYSTEM WITH IN-SITU MEASUREMENT OF END USER ACTIONS

BACKGROUND OF THE INVENTION

1. Field of the Invention

The present invention relates in general to the field of information handling system management, and more particularly to a system and method for proactive management of information handling systems with in-situ measurement of end user actions.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have helped to make people more productive by promoting efficient information management and communication. A downside to the widespread adoption of information handling systems is that failure of an information handling system often leaves an end user in a bad spot. With a soft failure, the end user can usually get the information handling system running again by taking corrective action. For example, a re-boot of an information handling system fixes any number of problems by resetting the data in memory that is used by the processor. Such minor failures are an inconvenience, although a poorly-timed re-boot can lose data recently generated by the end user and not yet saved to non-volatile memory, such as a hard disk drive. A catastrophic failure prevents the end user from using the information handling system, such as where a hard disk drive fails to make booting impossible. In the event of a hard disk failure, an end user typically loses all of the data stored on the hard disk drive. To prevent a loss of data, end users typically back-up data at another information handling system or storage device; however, even when data is backed-up, some data created after the time of the most recent back-up is likely still lost, and the end user faces the inconvenience of having to load the backed-up data to a replacement information handling system.

One way to avoid the inconvenience of an information handling system failure is to determine that system is likely to fail before the system actually fails so that the likely failure can be proactively addressed before an actual failure occurs. In order to predict an imminent failure, some systems monitor operating parameters with hardware and software monitoring agents and analyze the operating parameters with reasoning tools for indications of impending failures. For example, detection of outliers, faults and early warnings of failures use real time data and intelligent algorithms, but at a high expense both for design of the systems and for computational resources generally needed to track all types of failure modes and their symptoms on an information handling system in the field. Further, many faults and failures do not generate patterns that are detectable in advance via data and algorithms.

SUMMARY OF THE INVENTION

Therefore a need has arisen for a system and method which supports proactive management of an information handling system with in situ measurement of end user dissatisfaction.

In accordance with the present invention, a system and method are provided which substantially reduce the disadvantages and problems associated with previous methods and systems for management of information handling system operations with in situ monitoring. End user inputs to an information handling system are monitored for indications of end user dissatisfaction regarding the operation of the information handling system. If end user dissatisfaction is detected, then an alert issues to support proactive investigation of the cause of the dissatisfaction.

More specifically, an information handling system has a monitoring agent executing on a processing component, such as firmware instructions in a chipset, to monitor end user inputs at the information handling system that indicate end user dissatisfaction with the information handling system, such as corrective actions taken to respond to a fault. If dissatisfaction is detected, a reporting agent issues an alert to allow proactive management of any faults associated with the dissatisfaction. One or more dissatisfaction variables are defined for monitoring, such as forced power downs by pressing and holding a power switch, by removing external power and by removing internal battery power. Thresholds are determined for each dissatisfaction variable by tracking user inputs over a sample time period. If a monitored dissatisfaction variable exceeds a threshold, then an alert issues for proactive management of potential causes of the end user input associated with the dissatisfaction variable, such as by running diagnostics at the information handling system. In one embodiment, monitoring is increased in response to an alert to help diagnose the cause of end user dissatisfaction.

The present invention provides a number of important technical advantages. One example of an important technical advantage is that information handling system monitoring of dissatisfaction variables provides a low overhead management system that detects end user dissatisfaction with the operation of the information handling system. Proactive response to dissatisfaction variables addresses end user dissatisfaction, thus providing an end user with a more positive user experience. Since indications of end user dissatisfaction tend to increase as an information handling system approaches failure, a proactive response helps to detect an impending system failure so that corrective action can take place before the failure occurs. Dissatisfaction variables at an information handling system are monitored to identify a pattern of change in behavior by an end user rather than the operational status of components. Monitoring dissatisfaction variables provides a system level management solution that is independent of the particular components of a system to provide a universal low cost solution that addresses end user satisfaction rather than complex system specific operating variables.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Dissatisfaction variables monitored at an information handling system provide a proactive basis for addressing difficulties that arise with the information handling system as indicated by an end user's interaction with the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
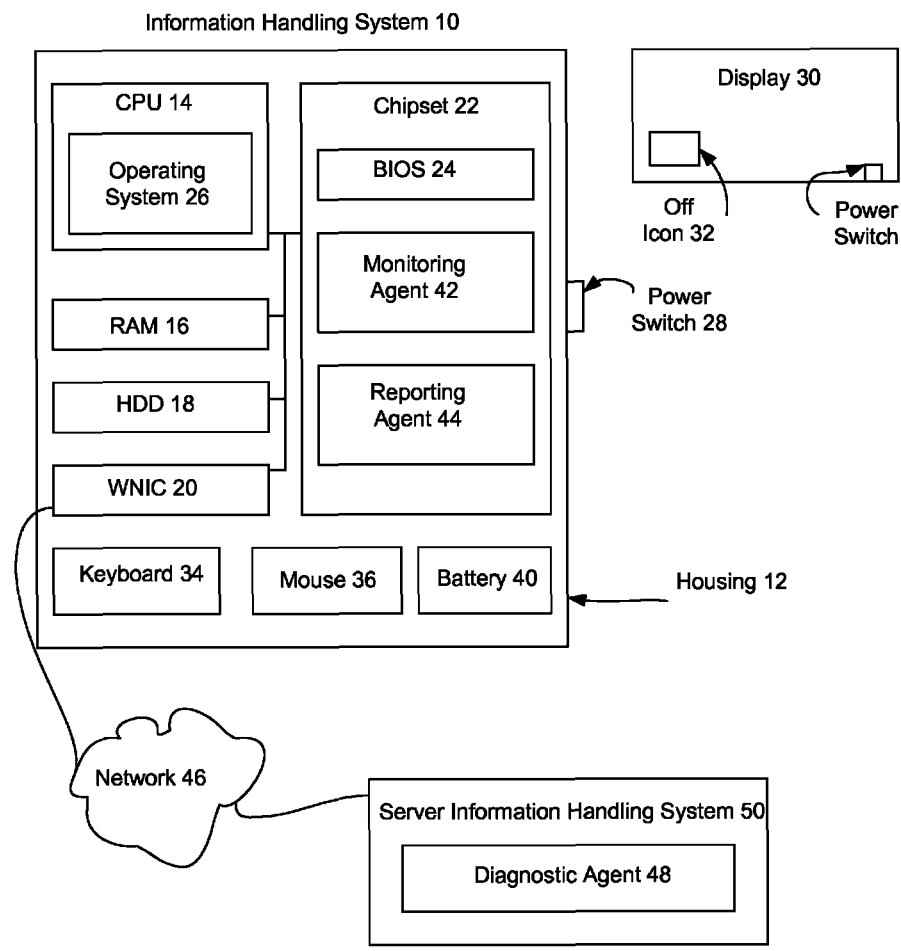
FIG. 1 depicts a block diagram of an information handling system that monitors end user dissatisfaction variables.

Referring now to FIG. 1, a block diagram depicts an information handling system 10 that monitors end user dissatisfaction variables. Information handling system 10 is built with a housing 12 that encloses plural processing components that cooperate to process information, such as a CPU 14, RAM 16, a hard disk drive 18, a wireless network interface card 20 and a chipset 22. Chipset 22 coordinates operations of the processing components at a physical level, such as with BIOS 24 firmware instructions. An operating system 26 executes on CPU 24 to provide a platform that supports operation of other applications on the processing components. During normal power up, BIOS 24 detects an end user input at power switch 28 and executes firmware instructions to bootstrap operating system 26 from non-volatile memory, such as hard disk drive 18, to an operational state on CPU 14 and RAM 16. During normal power down, operating system 26 presents a user interface at display 30 with a power off icon 32 that the end user selects using I/O devices, such as a keyboard 34 or mouse 36. Operating system 26 detects activation of power off icon 32 and, in response, sequences a power down of the processing components.

In some instances, information handling system 10 will run into difficulty, such as where a fault in stored data or other fault causes operating system 26 or applications running over operating system 26 to freeze. When this happens, end users can take a variety of corrective actions to attempt to bring information handling system 10 back to an operational state. One alternative available with WINDOWS is to press a combination of <cntrl> <alt> <del> keys to bring up an operating system task manager that allows a forced closing of a frozen application. If the operating system itself is frozen, the end user typically must perform a forced power down of information handling system by removing power. One way to perform a forced power down is to press and hold power switch 28 for a defined time period, such as four seconds. BIOS 24 detects the held power switch 28 as an indication for a forced power down and in response removes power from the processing components without coordination of operating system 26. In some instances, a fault occurs with firmware instructions so that BIOS 24 fails to detect a forced power down input at power switch 28. In such instances, end user corrective actions include removal of power to information handling system 10, such as by unplugging an external power source 38 or removing an internal power source 40. Generally, an information handling system that freezes will operate normally after another power up and boot, however, end users will typically feel dissatisfaction at the system's performance, especially if information was lost due to a forced power down.

In order to track end user dissatisfaction with information handling system 10, a monitoring agent 42 tracks as dissatisfaction variables the end user inputs to information handling system 10 that are indicative of end user dissatisfaction with the operation of information handling system 10. For example, in one embodiment, a dissatisfaction variable is an end user input made as a corrective action at information handling system 10. Some examples of such dissatisfaction variables include: system restarts commanded through the operating system; system shutdowns using operating system instructions; forced power downs by pressing and holding the power switch; forced power downs by removing external power, such as a wall plug or AC adapter; forced shutdowns by removing a battery from the system; opening and closing of a rotatable lid of a portable system; turning a wireless network interface card transceiver on and off; enabling and disabling wireless communication through system software; end user system shut down in response to a high thermal event; removing and inserting hardware, such as a hard disk drive, CPU, mini-card or optical drive identified as the same hardware by reference to a hardware unique serial number; opening and closing a housing cover; docking and undocking the system from a port replicator; turning a display monitor on and off; using a task manager or similar tool to shut down non-responsive tasks or processes; and system halts due to operating system or application exceptions, such as a system crash, kernel error, stop error or "Blue Screen of Death". In some instance, a dissatisfaction variable is defined over a time period, such as inputs that cycle components on and off as might be performed by an end user having difficulty with the component. In one embodiment, dissatisfaction variables are built with use cases by capturing end user input patterns to identify patterns that correlate with user dissatisfaction as expressed by end users, with performance issues or with impending system failure.

Monitoring agent 42 continuously monitors inputs at information handling system 10 to identify dissatisfaction variables, such as corrective actions. Monitoring agent 42 is, for example, firmware instructions executing in chipset 22 that tracks dissatisfaction variables from the operating system via WMI calls, directly from hardware application programming interfaces, or from a BIOS or system diagnostics interface. Monitoring agent 42 processes inputs over a sample time period to define a baseline of expected inputs for the end user. For example, an end user who uses a forced power down at the end of each work day would have a baseline of one forced power down that fits into that end user's normal usage pattern. Once monitoring agent 42 establishes a baseline for a dissatisfaction variable, monitoring agent 42 monitors for changes in behavior patterns associated with the dissatisfaction variable. If a change in behavior of end user inputs from a baseline dissatisfaction variable is detected, then a reporting agent 44 interfaced with monitoring agent 42 issues an alert, such as by communicating a message through a network 46 to a diagnostics agent 48 operating on a server information handling system 50. Diagnostics agent 48 takes proactive measures to diagnose problems with information handling system 10 and otherwise address end user dissatisfaction with information handling system 10. One advantage of this approach is that a trouble ticket for correcting the information handling system can be created and acted upon without an end user initiated contact to a service center or analysis by a technician.

Figure 2:
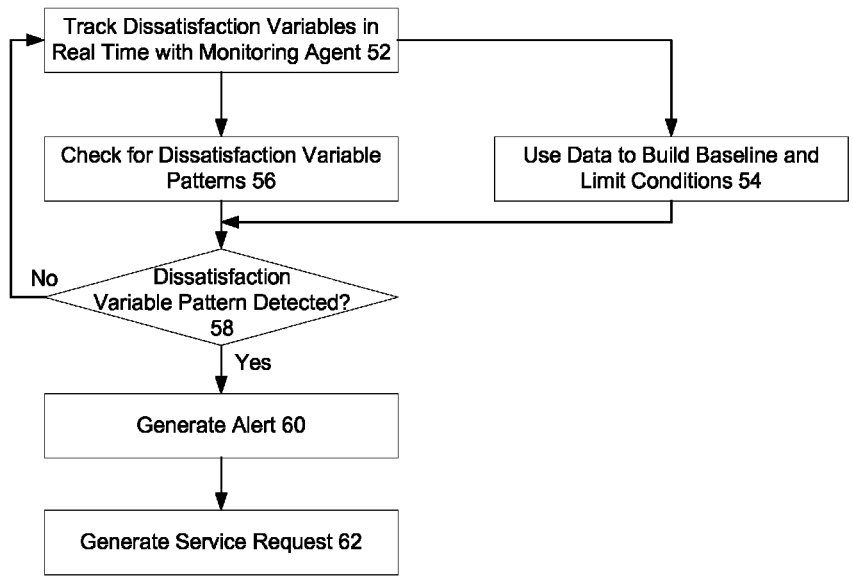
FIG. 2 depicts a flow diagram of one embodiment of a process for monitoring end user dissatisfaction variables at an information handling system.

Referring now to FIG. 2, a flow diagram depicts one embodiment of a process for monitoring end user dissatisfaction variables at an information handling system. The process starts at step 52 with a monitoring agent executing on an information handling system tracking dissatisfaction variables in real time at the information handling system. At step 54, dissatisfaction variable information over a sample time period is used to build a baseline of expected end user inputs and limit conditions that will result in issuance of an alert. At step 56, a check is made of monitored dissatisfaction variable information to determine if a limit condition or threshold over the baseline is detected. As an example, an end user who performs a forced shutdown once a day who has a forced shutdown twice in one day exceeds the baseline expected value by 100%. If a predetermined dissatisfaction variable pattern is not detected at step 58, the process returns to step 52 to continue monitoring the information handling system. If a predetermined dissatisfaction variable pattern is detected at step 58, the process continues to step 60 generate an alert and to step 62 to generate a service request for proactive management of end user dissatisfaction with the information handling system.

Figure 3:
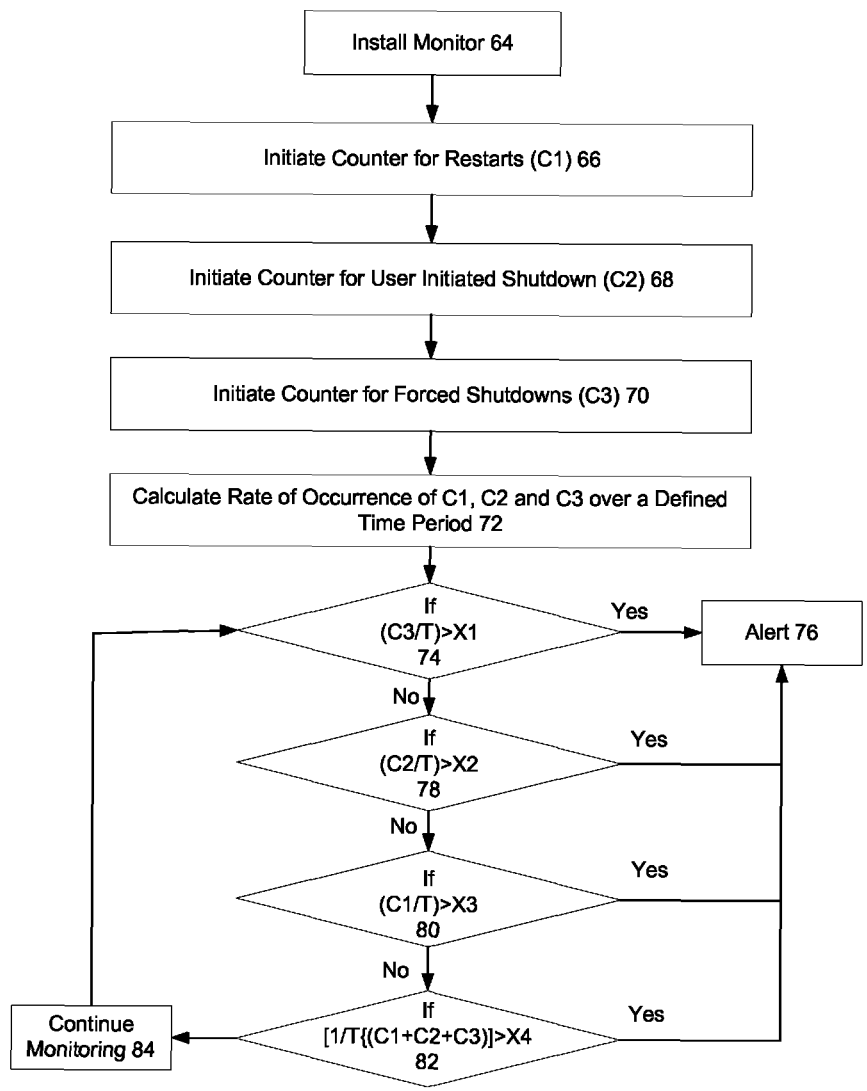
FIG. 3 depicts a flow diagram of another embodiment of a process for monitoring end user dissatisfaction variables at an information handling system.

Referring now to FIG. 3, a flow diagram depicts another embodiment of a process for monitoring end user dissatisfaction variables at an information handling system. In the embodiment depicted by FIG. 3, three dissatisfaction variables are monitored. At step 64, a monitor is installed at the information handling system to track dissatisfaction variables. At step 66 a counter is initiated to count restarts initiated at the information handling system. At step 68 a counter is initiated to count user initiated shutdowns at the information handling system. At step 70, a counter is initiated to count forced shutdowns of the information handling system. For example, a forced shutdown may be defined by a specific action, such as pressing and holding a power button or removing external power, or may be defined by an action taken without normal operating system management, such as a shutdown that is not commanded through the operating system. At step 72, a rate of occurrence is calculated for each dissatisfaction variable over a sample time period. At step 74 a comparison is made between the rate of restarts detected and a threshold value of the rated of expected restarts. If the rate of detected restarts exceeds the threshold, the process continues to step 76 to issue an alert. If not, the process continues to step 78 to compare the detected rate of user initiated shutdowns with a threshold value of an expected rate of user-initiated shutdowns. If the rate of detected user initiated shutdowns exceeds the threshold, the process continues to step 76 to issue an alert. If not, the process continues to step 80 to compare the detected rate of forced shutdowns with a threshold value of an expected rate of forced shutdowns. If the detected rate of forced shutdowns exceeds the threshold, then the process continues to step 76 to issue an alert. If not, then the process continues to step 82 to compare a summation of the dissatisfaction values with a summation threshold. If the summation exceeds a threshold, the process continues to step 76 to issue an alert, otherwise the process continues to step 84 to continue monitoring.

Threshold values are set for each dissatisfaction variable to catch dissatisfaction by an end user without incorrectly finding dissatisfaction. For example, a threshold value is set so that minor difficulties will not exceed the threshold while more serious issues, such as impending system failures will trip the threshold. In one embodiment, non-parametric thresholds are developed using historical data of the dissatisfaction variable. For example, an example of an upper limit for the rate of forced shutdowns (C3/T) is calculated:

$$X1 = Q3_{(C3/T)} + 1.5(Q3 - Q1)_{(C3/T)}$$

Where Q3 and Q1 are the third and first quartile of the C3/T historic data used as a baseline. Alternatively, parametric thresholds may be computed by fitting data collected during baseline to a parametric distribution, such as a normal distribution. For example, a threshold for C3/T may be set at a value of greater than the 98$^{th}$ percent cumulative value calculated from the mean and standard deviation of the baseline data collected with initial sampling.

Figure 4:
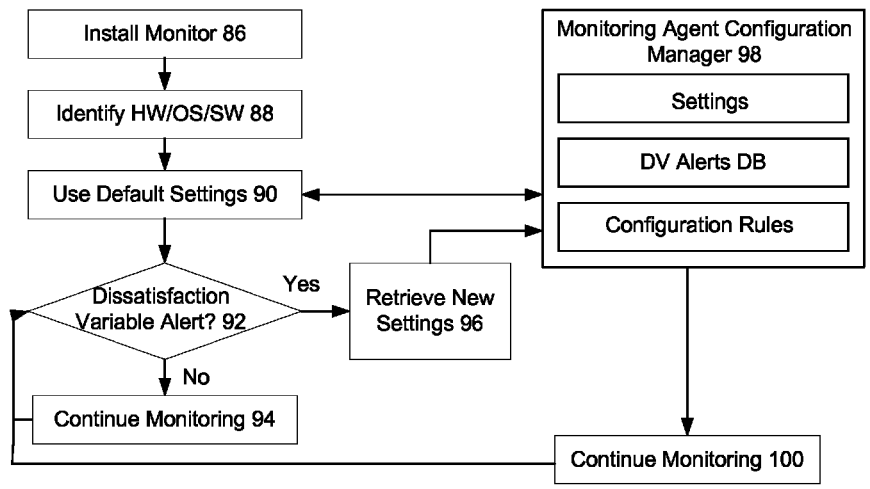
FIG. 4 depicts a flow diagram of a process for performing diagnostics in response to an alert for a change in an end user dissatisfaction variable.

Referring now to FIG. 4, a flow diagram depicts a process for performing diagnostics in response to an alert for a change in an end user dissatisfaction variable. The process starts at step 86 with installation of a monitoring agent at an information handling system. At step 88, the monitoring agent determines the hardware and software configuration of the information handling system. At step 90, the monitoring agent initiates monitoring with default settings provided from a monitoring agent manager, such as a network location that stores default settings, alert thresholds and configuration rules. At step 92, a determination is made of whether a dissatisfaction variable alert should issue for monitored dissatisfaction variables. If not, the process continues to step 94 to continue monitoring the default dissatisfaction variables. If an alert issues at step 92, the process continues to step 96 to check with the monitoring agent configuration manager at step 98 for new dissatisfaction variables. At step 100, the updated dissatisfaction variables are set and monitored so that diagnosis of the cause of the alert dissatisfaction variable can be identified.

In one example embodiment, the monitoring agent configuration manager responds to the alert by increasing the frequency of monitoring of selected dissatisfaction variables. In another embodiment, the monitoring agent configuration manager increases the number of different dissatisfaction variables that are monitored to provide more information for diagnosis, break-fix and root cause assessment. For instance, if a dissatisfaction variable alert issues due an end user inserting and removing the battery of a portable information handling system, then the monitoring agent configuration manager changes monitoring agent settings to monitor additional battery parameters, such as charge-level, charge capacity, cycle count and battery serial number. This additional information validates a number of scenarios, such as multiple battery use by swapping batteries, charge level variations and anomalous readings the system if any exist. By narrowing the possible causes of use dissatisfaction, the chances of a false detection of dissatisfaction are reduced.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   processing components disposed in the housing and operable to process information;
   plural input devices interfaced with the processing components, each input device operable to detect one or more end user inputs;
   a monitoring agent disposed in the housing and operable to track one or more predetermined of the end user inputs as one or more dissatisfaction variables, each dissatisfaction variable associated with a corrective action made by an end user input; and
   a reporting agent interfaced with the monitoring agent and operable to track corrective action as an incident and to request proactive diagnostics of the information handling system in response to detection of a predetermined plural number of incidents in a predetermined time period.

2. The information handling system of claim 1 wherein the dissatisfaction variable comprises restarts of the information handling system initiated through the operating system.

3. The information handling system of claim 1 wherein the dissatisfaction variable comprises shutdowns of the information handling system through the operating system.

4. The information handling system of claim 1 wherein the dissatisfaction variable comprises forced shutdowns of the information handling system.

5. The information handling system of claim 4 wherein the forced shutdown comprises pressing and holding a power switch of the information handling system.

6. The information handling system of claim 4 wherein the forced shutdown comprises removal of a battery from the housing.

7. The information handling system of claim 4 wherein the forced shutdown comprises removal of an external power source from the information handling system.

8. The information handling system of claim 1 wherein the dissatisfaction variable comprises turning a wireless network transceiver off and on.

9. The information handling system of claim 1 wherein the reporting agent is further operable to formulate a baseline number of incidents by monitoring the dissatisfaction variable for a predetermined time and assess a change from the baseline to set the predetermined plural number of incidents at which to request proactive diagnostics.

10. A method for managing operation of an information handling system, the method comprising:
    monitoring an end user input at the information handling system over a predetermined time to define a baseline number for the end user input over a predetermined time period, the end user input associated with a corrective action for an error at the information handling system;
    detecting an increase of the end user input at the information handling system over the predetermined time period; and
    issuing a dissatisfaction alert for the information handling system.

11. The method of claim 10 wherein the end user input comprises a forced power down.

12. The method of claim 11 wherein the forced power down comprises pressing and holding a power button to command a power down.

13. The method of claim 11 wherein the forced power down comprises removal of power from the information handling system.

14. The method of claim 10 wherein the end user input comprises removing a component from the information handling system and replacing the same component in the information handling system.

15. The method of claim 10 wherein the end user input comprises powering a display of the information handling system down and then up within a predetermined time.

16. The method of claim 10 further comprising increasing the number of dissatisfaction variables monitored at the information handling system in response to the alert.

17. The method of claim 10 further comprising responding to the dissatisfaction alert with a diagnostics associated with the end user input.

18. A system for managing operation of an information handling system, the system comprising:
    non-transitory memory storing:
    a monitoring agent operable to track an end user input at the information handling system, the end user input associated with a corrective action made by an end user to correct improper operation of the information handling system; and
    a reporting agent interfaced with the monitoring agent and operable to report an alert for the information handling system in response to detection of plural of the end user inputs monitored by the monitoring agent over a predetermined time period, the plural number of the end user input at the information handling system reported by the reporting agent if the plural number is greater than a threshold number.

19. The system of claim 18 further comprising a diagnostics agent interfaced with the reporting agent and operable to initiate diagnostic at the information handling system in response to the alert.

20. The system of claim 19 wherein the corrective action made by an end user comprises a forced power down of the information handling system.

* * * * *